United States Patent [19]
McFarland

[11] 3,983,704
[45] Oct. 5, 1976

[54] SOLAR OPERATED THERMODYNAMIC DRIVE

[76] Inventor: Lorrell C. McFarland, 417 E. 12, Claremore, Okla. 74017

[22] Filed: June 23, 1975

[21] Appl. No.: 589,640

[52] U.S. Cl. ................................. 60/641; 60/675; 60/682; 60/639
[51] Int. Cl.² .......................................... F03G 7/02
[58] Field of Search ............ 60/641, 675, 650, 682, 60/530, 643, 645

[56] References Cited
UNITED STATES PATENTS

| | | | |
|---|---|---|---|
| 196,759 | 11/1877 | Miller | 60/675 |
| 3,352,108 | 11/1967 | Eddy | 60/675 |

*Primary Examiner*—Allen M. Ostrager
*Attorney, Agent, or Firm*—Robert K. Rhea

[57] ABSTRACT

A liquid-tight fluid container forming a primary chamber is provided with a vertical standpipe communicating, at its depending end, with the bottom area of the primary chamber and communicating with an elevated tank and chamber, at its upper end, in vertically spaced relation above the primary chamber. The elevated tank is formed in a fluid reservoir in turn communicating with the depending end portion of the primary chamber through a check valve. Solar rays heat fluid which circulates through a heat exchanger disposed in the primary chamber to expand a volatile liquid therein and force it through the standpipe into the elevated tank. The liquid is returned to the reservoir bottom. The liquid drives a hydraulic motor by its movement to or from the elevated tank or both.

6 Claims, 1 Drawing Figure

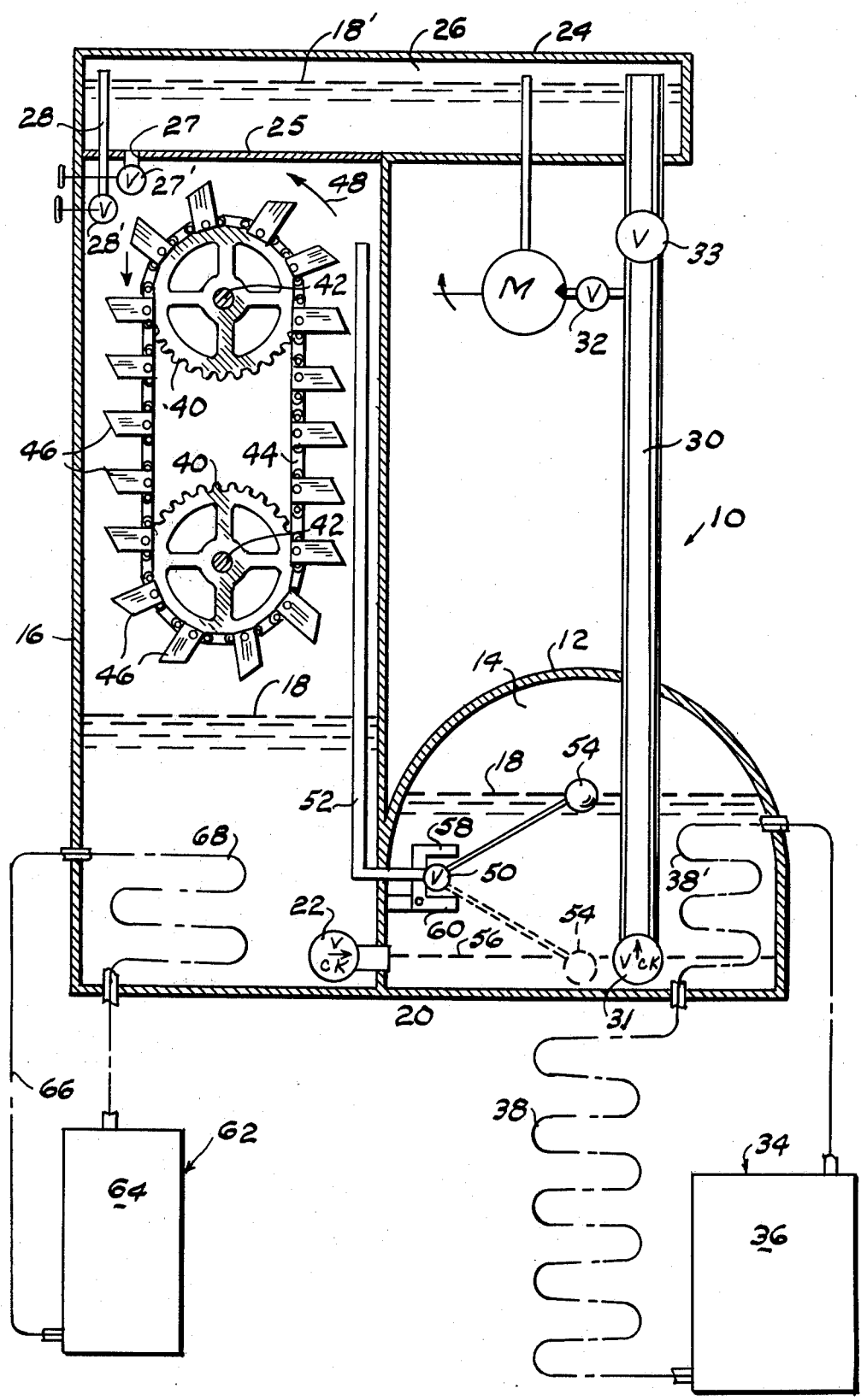

SOLAR OPERATED THERMODYNAMIC DRIVE

BACKGROUND OF THE INVENTION

1. Field of the Invention

The present invention relates to converting solar energy to mechanical energy and more particularly to a thermodynamic device utilizing solar heat for expanding and elevating a fluid to an elevated tank which generates mechanical energy by its movement from and return to the primary chamber.

2. Description of the Prior Art

Prior patents for converting solar energy to mechanical energy have generally comprised confining a volatile liquid which is heated by sun rays so that the vapor thereof is directed toward and drives a turbine, or the like. The principal problem with such an apparatus resides in sufficiently cooling the vapor after it has performed its work to form a liquid to be returned to its point of beginning.

This invention utilizes the principal of heating volatile liquid by sun rays but utilizes gas pressure generated by vaporizing a portion of the liquid to elevate a major portion of the volatile liquid in a liquid state for driving a hydraulic motor.

SUMMARY OF THE INVENTION

A fluid-tight primary chamber formed by a container contains a quantity of volatile liquid. A standpipe communicates, at its respective ends, with the depending portion of the primary chamber and an elevated tank in spaced relation above the primary chamber. The elevated tank is formed in the upper end portion of a reservoir by a horizontal partition. The reservoir receives returned fluid and extends vertically between one side of the depending end portion of the primary chamber and the elevated tank. A hydraulic motor, connected with the standpipe, is operated by the liquid movement to the elevated tank.

A pair of vertically spaced sprocket wheels, journalled on axles extending through the reservoir walls in its intermediate portion, are provided with an endless chain entrained therearound having liquid receiving buckets transversely connected thereto in spaced relation longitudinally of the chain to form a water wheel-type motor. The partition, forming a bottom wall of the elevated tank, is provided with an outlet port and dispenses liquid collected in the elevated tank into the reservoir. The falling liquid successively fills the buckets and rotates the chain and sprockets.

An elongated liquid containing conduit, exposed to solar energy, is entrained through the depending end portion of the primary chamber in heat exchange fashion to heat the liquid therein and elevate it through the standpipe. A float operated valve, in the primary chamber, equalizes gas pressure between the primary chamber and reservoir for refilling the primary chamber with liquid from the reservoir at predetermined intervals.

The principal object of this invention is to provide an apparatus utilizing energy for partially vaporizing a volatile liquid which is used for driving fluid motors as a mechanical power source.

BRIEF DESCRIPTION OF THE DRAWING

The single FIGURE is a partially schematic and cross sectional view of the device.

DESCRIPTION OF THE PREFERRED EMBODIMENT

In the drawing:

The reference numeral 10 indicates the device, as a whole, comprising a container 12 forming a primary chamber 14 and a reservoir 16. The chamber 14 contains a quantity of volatile liquid 18. The liquid used in closed refrigeration systems is satisfactory, such as that presently marketed under the tradename Freon 11. The reservoir 16 also contains a quantity of the liquid 18. The depending end portions of the chamber 12 and reservoir 16 are in communication by a port 20 opened and closed by a check valve 22 in the manner hereinafter explained.

The reservoir 16 extends vertically above the container 12 a substantial distance and is provided, at its upper end, with a laterally extending wing portion 24 overlying the container 12 in vertically spaced relation. A transverse horizontal partition 25 in the upper end portion of the reservoir forms an elevated tank and chamber 26 in combination with the wing portion 24 for receiving liquid 18' from the primary chamber 14. The partition 25 is provided with an outlet port 27 opened and closed by a remotely controlled valve 27'. A tube 28, extending vertically through the partition 25, terminating adjacent the inner surface of the upper limit of the reservoir, is opened and closed by a remotely controlled valve 28' to retain or release gas pressure within the elevated chamber 26 for the purposes presently explained.

A standpipe 30, forming a fluid passageway, extends through the upper limit of the container 12 and into the reservoir wing 24 and terminates at its upper end below the upper limit of the elevated tank chamber 26. The depending end of the standpipe 30 is provided with a check valve 31. A first hydraulic motor M has its inlet and exhaust connected by tubing with the standpipe 30 and elevated tank respectively with a control valve 32 interposed in the tubing between the standpipe 30 and motor M. A control valve 33, in the standpipe between its connection with the motor M and the elevated tank, diverts liquid to the motor M when the valve 33 is closed.

A heat exchange unit, indicated generally at 34, comprises a liquid containing tank 36 connected with pipe 38 entrained in a tortuous configuration across the surface of the earth for exposure to sun rays for heating and self circulating the liquid therein. The pipe 38 is similarly entrained through the container 12 in a tortuous fashion, as at 38', for heating the volatile liquid 18. Gas generated by vaporizing the volatile liquid 18 fills the space in the primary chamber 14 above the volatile liquid 18 so that the gas pressure against the liquid, expanded as a result of the heat exchanger 38', forces the liquid upwardly through the standpipe 30 and into the tank chamber 26.

A second hydraulic motor means comprising a water wheel-like device is disposed within the reservoir and comprises a pair of sprocket wheels 40, respectively journalled vertically in spaced relation by axles 42, extending transversely of the reservoir and having an endless chain 44 entrained therearound. The chain 44 is provided with a plurality of spaced-apart cups or buckets 46 so that one run of the chain successively positions the buckets 46 in the path of liquid 18' discharged from the receiving tank chamber 26. The falling liquid successively fills the buckets and the mass of the liquid filled buckets rotates the chain and sprocket wheels in the direction of the arrows 48. At least one of the axles 42 projects outwardly through the wall of the reservoir 16 to provide a power drive for driving mechanical equipment, such as a generator, or the like, not shown.

Continued depletion of the volatile liquid 18, within the primary chamber 14, results in an increase in gas pressure above that in the reservoir above the liquid therein thus preventing a supply of the liquid entering the primary chamber 14 from the reservoir through the check valve 22.

A float valve 50, disposed within the depending end portion of the container 12, communicates with the reservoir above the liquid level therein by tubing 52. The valve 50 is normally maintained closed by a float 54. Upon depletion of the volatile liquid 18, to a predetermined lower level, indicated by the dashed line 56, the float, when in its dotted line position, opens the valve 50 to equalize gas pressure between the chamber 14 and reservoir 16 thus allowing the check valve 22 to open and refill the chamber 12 until the float 54 is returned to its solid line position which closes the equalizing valve 50. Upper and lower stops 58 and 60, associated with the float valve 50, limits vertical movement of the float 54 and are vertically adjustable in unison for controlling the position of the float 54 when it opens and closes the float valve 50 and maintaining the volatile liquid 18 between predetermined levels within the chamber 14.

Since the temperature of liquid collecting in the reservoir 16, returned from the elevated tank 26 remains high, a second heat exchange unit, indicated generally at 62, is provided for cooling the liquid 18 within the reservoir. The heat exchange unit 62 comprises a tank 64 filled with a cool liquid, such as water, which is connected by piping 66 similarly entrained in a tortuous self circulating fashion, as at 68, through the depending end portion of the reservoir 16.

The above described action of the device 10, including operating the motor M as a power source continues while sun rays are falling on the piping run 36. Obviously additional tanks may be connected in tandem with the heat exchanger tank 36 for storing a larger quantity of solar heated fluid so that heating of the volatile liquid 18 may continue while sun rays are not falling on the piping run 38. It seems obvious that additional stages of the device 10 may be arranged successively, one above the other, with the heat exchange units 38' entrained through each additional boiler forming primary chamber 12 to elevate the volatile liquid to any desired height to increase the potential of power available. Similarly, the potential of the drive may be increased by increasing the size of the primary chamber 12 and providing a plurality of the standpipes 30 and motors M through which the liquid is elevated. Alternatively, a plurality of boiler forming primary chambers 12 may be similarly connected with the reservoir 16 and operatively arranged so that at least one boiler chamber 12 is discharging fluid 18 into the chamber 26 while the other chamber or chambers are being recharged with fluid 18 from the reservoir 16.

Obviously the invention is susceptible to changes or alterations without defeating its practicability. Therefore, I do not wish to be confined to the preferred embodiment shown in the drawings and described herein.

I claim:

1. A solar energized thermodynamic motor, comprising:
    a container forming a primary chamber having a quantity of volatile liquid therein;
    a volatile liquid reservoir adjacent and in communication with said container and projecting upwardly thereabove;
    a receiving tank within the upper end portion of said reservoir, said receiving tank having a discharge port for releasing liquid toward the depending limit of the reservoir;
    a standpipe providing liquid communication between said container and said receiving tank;
    fluid level operated means maintaining the quantity of volatile liquid within the primary chamber between predetermined limits;
    solar heat exchange means including a length of liquid filled piping entrained through the volatile liquid in the primary chamber for progressively vaporizing and elevating the volatile liquid in a liquid state through the standpipe; and,
    hydraulic motor means driven by liquid moving toward and away from said receiving tank.

2. The solar energized motor according to claim 1 in which said valve means includes;
    a float valve within said primary chamber;
    a float for opening and closing said float valve;
    tubing connected with said float valve and extending into said reservoir above the liquid therein for equalizing gas pressure between said primary chamber and the reservoir when the float valve is opened; and,
    a first check valve permitting liquid flow from said reservoir to said primary chamber when gas pressure has been equalized.

3. The solar energized motor according to claim 2 in which said valve means further includes:
    a second check valve connected with the depending end of said standpipe permitting upward flow of liquid.

4. The solar energized motor according to claim 3 in which said hydraulic motor means includes:
    a hydraulic motor; and,
    tubing and hydraulic motor control valve means connecting said hydraulic motor with said standpipe and said receiving tank.

5. The solar energized motor according to claim 3 in which said hydraulic motor means includes:
    a pair of vertically disposed vertically spaced sprockets respectively journalled on axles extending transversely of said reservoir,
    one end portion of one said axle projecting outwardly of said reservoir;
    a chain entrained around said sprockets; and,
    a plurality of buckets secured in spaced relation longitudinally of said chain.

6. The solar energized motor according to claim 5 and further including:
    other heat exchange means including a cool liquid containing tank; and,
    other piping connected with said cool liquid tank and extending, intermediate its ends, through the depending end portin of said reservoir.

* * * * *